Dec. 11, 1923.

H. N. ATWOOD 1,477,025

METHOD OF PRODUCING VEHICLE WHEELS

Original Filed Nov. 21, 1921    2 Sheets-Sheet 1

Inventor

Harry N. Atwood.

By Lacey & Lacey, Attorneys

Dec. 11, 1923.
H. N. ATWOOD
1,477,025
METHOD OF PRODUCING VEHICLE WHEELS
Original Filed Nov. 21, 1921    2 Sheets-Sheet 2
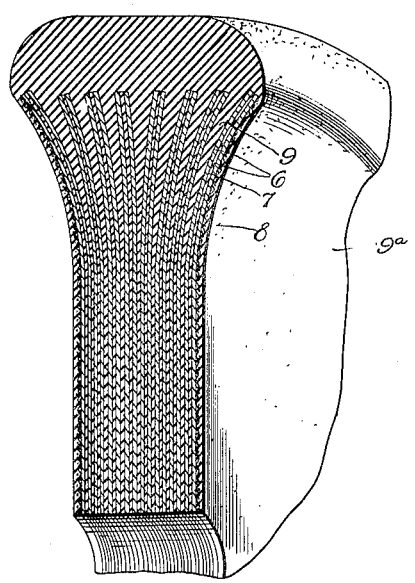
Fig. 2.
Fig. 3.
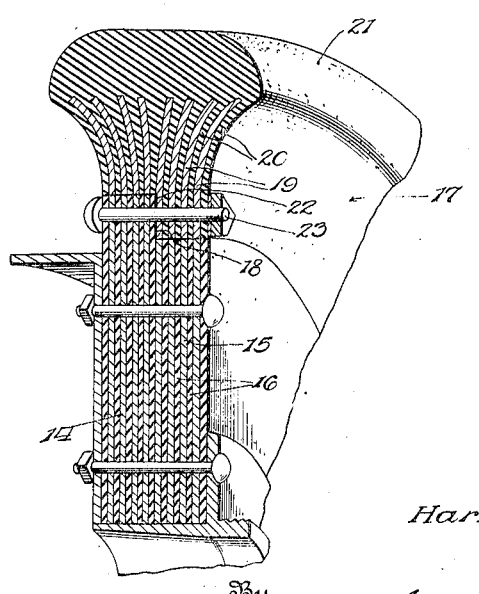
Inventor
Harry N. Atwood.
By Lacey & Lacey, Attorneys Patented Dec. 11, 1923.

1,477,025

UNITED STATES PATENT OFFICE.

HARRY N. ATWOOD, OF BOSTON, MASSACHUSETTS, ASSIGNOR TO RUBWOOD, INC., OF LAWRENCE, MASSACHUSETTS, A CORPORATION OF MASSACHUSETTS.

METHOD OF PRODUCING VEHICLE WHEELS.

Original application filed November 21, 1921, Serial No. 516,766. Divided and this application filed November 29, 1922. Serial No. 604,074.

*To all whom it may concern:*

Be it known that I, HARRY N. ATWOOD, a citizen of the United States, residing at Boston, in the county of Suffolk and State of Massachusetts, have invented certain new and useful Improvements in Methods of Producing Vehicle Wheels, of which the following is a specification.

This invention relates to a novel method of producing a composite vehicle wheel such as the wheel shown in my copending application, filed November 21, 1921, Serial No. 516,766, for which Patent 1,458,379 was granted June 12, 1923, and of which this application is a division.

The wheel disclosed in the said copending application comprises a body and tread, the body being made up of plies of veneer and rubber material, and the tread being also of rubber material and integrally incorporated or united with the rubber plies of the body, and the present invention therefore contemplates evolving a novel method by the carrying out of which a wheel of this structure may be produced.

In the accompanying drawings:

Fig. 2 is a similar view illustrating another form of wheel thus produced;

Figure 3 is a similar view illustrating a modification in which a portion of the wheel is separable from the body to provide for renewal of the parts which are most subjected to wear.

Figure 1:
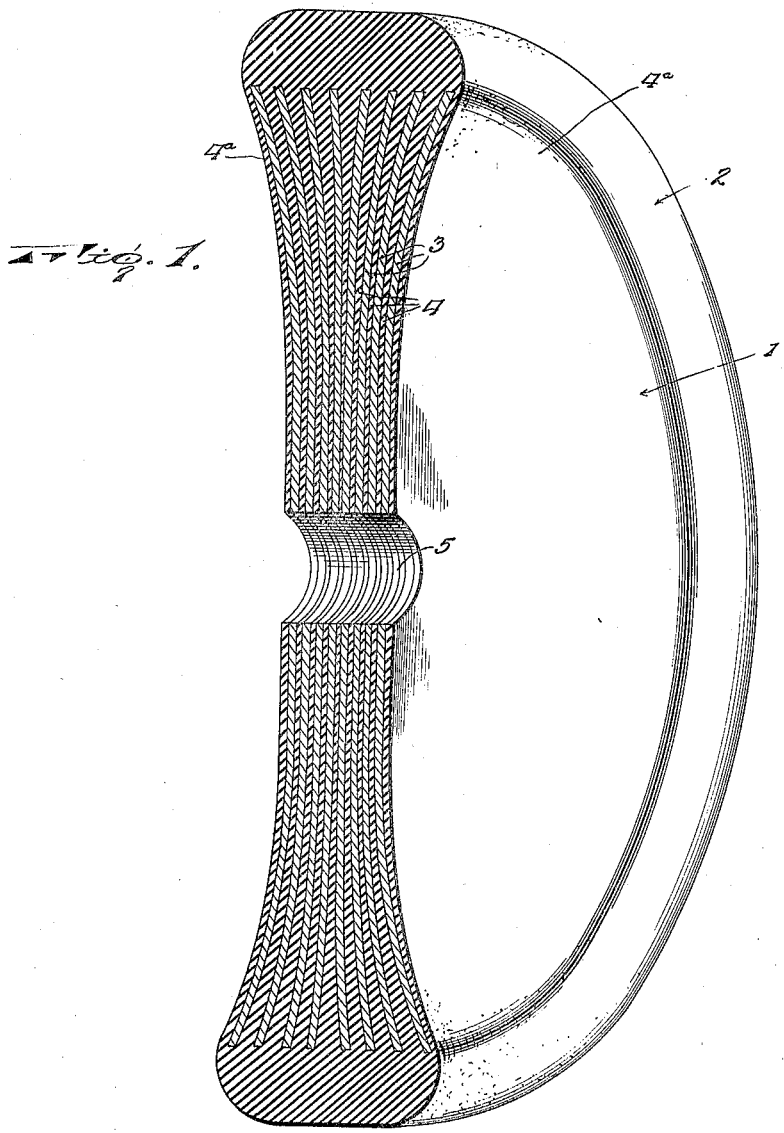
Figure 1 is a sectional perspective view of one form of vehicle wheel produced in accordance with the method of the present invention.

The wheel, in all forms of the invention comprises a body portion 1 and a tread portion 2. The body of the wheel shown in Fig. 1 is of laminated structure and comprises a plurality of veneer plies 3 and intervening plies 4 of rubber. In preparing the veneer plies 3, these plies are given substantially the dished form shown in the said figure, the intermediate ones of the plies being but slightly dished and the other plies at opposite sides thereof being dished or curved in gradually increasing degrees so that when the plies are assembled, the spaces between adjacent plies will be of gradually increasing width in the direction of the periphery of the wheel. The rubber plies 4 are prepared in such form as to substantially correspond to the spaces between the veneer plies, and in the course of manufacture of the wheel, the veneer and rubber plies are assembled and alternately arranged, and facing plies of rubber indicated by the numeral $4^a$ are disposed against the outer faces of the outermost veneer plies 3.

It is stated above that the veneer plies are given the dished form shown prior to assemblage with the rubber plies but it will be understood that inasmuch as the rubber plies are of gradually increasing thickness from their central portions to their peripheries, the veneer plies, if not previously given the dished form, will be caused to assume this form when assembled with the rubber plies and when the final step of the method is performed, namely that of subjecting the assemblage to heat and pressure to effect a union of all of the plies and a partial vulcanization of the rubber.

Having assembled the veneer and rubber plies in the manner above pointed out, the tread 2 is built up from a mass of rubber which is applied about the periphery of the assemblage of veneer and rubber plies and roughly shaped to the required form. The assemblage is then placed within a suitable mold and subjected to heat and pressure, as a consequence of which treatment the rubber will be vulcanized and the plies 4 will become intimately united to the veneer plies 3 and will bond the latter plies together and will constitute a resilient or cushioning component element of the wheel body. Also during this step in the method, the tread 2 will become intimately incorporated with the peripheral portions of the rubber bonding plies 4 so that the completed product will constitute an integral whole, no portion of which is separable from another portion without actual disintegration or tearing apart of the structure. It will be understood, of course, that in this last step of the method, the tread 2 will be given any required dimensions and contour and its ground-engaging surface may be fashioned in any suitable manner to provide against skidding. Also in this step of the method, the wheel as a whole may be shaped as desired and the body may be constructed in any manner found necessary for the application to the wheel of the usual appliances or equipment such as the hub, brake, drum, and the like, and in the present instance the body is formed for example with an opening 5 to receive the hub of ordinary construction.

In producing the form of wheel shown in Fig. 2 of the drawings, the veneer plies which are indicated by the numeral 6, are arranged in pairs or other multiples, and in building up the assemblage the bonding plies which are indicated by the numeral 7, are interposed between the veneer plies as illustrated in the said figure. Also in building up this form of wheel, a foraminous ply 8 of wire mesh or other similar material is embedded in the outermost rubber plies which are indicated by the numeral 9ª and which constitute the facing plies of the wheel, the other bonding plies being indicated by the numeral 9 and corresponding in every respect to the bonding plies 4 previously described. Of course, the component parts of the wheel, in this embodiment, are assembled in the same manner as in the previously described steps.

It will be understood that the structure might be modified as shown in Fig. 3 so that the tread may be dismounted or separated from the body of the structure when the tread becomes so worn as to be useless. In this structure the body of the wheel is indicated by the numeral 14 and is built up of veneer plies 15 and bonding plies 16, and the body is provided with a demountable tread section 17 comprised of veneer plies 19 and bonding plies 20, in order to accommodate which section the body 14 may be rabbeted as at 18. The tread is indicated by the numeral 21, and the inner peripheral portion of the section 17 is rabbeted as at 22 so as to adapt it to be assembled with the rabbeted periphery of the body 14, bolts 23 being removably fitted through the rabbeted peripheries of the body and tread section for removably securing the latter in place upon the former.

It will be understood that wire mesh plies may be embedded in any or all of the rubber bonding and facing plies in the various illustrated embodiments of the invention, or may be omitted altogether.

Having thus described the invention, what is claimed as new is:

1. The method of producing a vehicle wheel which comprises assembling veneer plies and intervening bonding plies of rubber, building up a tread of rubber stock about the periphery of the assemblage, and subjecting the whole to a process of vulcanization.

2. The method of producing a vehicle wheel which comprises assembling reinforcing plies and intervening bonding plies of rubber, building up a tread of rubber stock about the periphery of the assemblage, and subjecting the whole to vulcanization.

3. The method of producing a vehicle wheel which comprises producing plies of rubber material increasing in thickness in the direction of their peripheries, assembling veneer plies with the said rubber plies, building up a tread of rubber stock about the periphery of the assemblage, and subjecting the whole to heat and pressure.

4. The method of producing a vehicle wheel which comprises assembling veneer plies and intervening bonding plies of rubber, applying plies of rubber to the outer faces of the outermost veneer plies, building up a tread of rubber stock about the periphery of the assemblage, and vulcanizing the whole.

In testimony whereof I affix my signature.

HARRY N. ATWOOD. [L. S.]